United States Patent
Daily et al.

(10) Patent No.: US 8,406,791 B1
(45) Date of Patent: Mar. 26, 2013

(54) AUDIO ON LOCATION

(75) Inventors: Mike Daily, Thousand Oaks, CA (US);
Kevin Martin, Oak Park, CA (US);
Timothy Hirzel, Wayland, MA (US)

(73) Assignee: HRL Laboratories, LLC, Malibu, CA (US)

( * ) Notice: Subject to any disclaimer, the term of this patent is extended or adjusted under 35 U.S.C. 154(b) by 2822 days.

(21) Appl. No.: 09/690,574

(22) Filed: Oct. 17, 2000

(51) Int. Cl.
*H04Q 7/20* (2006.01)

(52) U.S. Cl. .......... 455/461; 455/456.1; 455/456.3; 455/404.1; 455/3.06; 455/414.1; 379/88.06; 379/88.14; 379/88.13

(58) Field of Classification Search .......... 455/3.05, 455/3.06, 461, 403, 456.1–456.7, 517, 414, 455/550.1, 404.1, 404.2, 422.1, 412.1, 412.2, 455/414.1–414.4, 556.1, 445, 500, 557; 379/88.06, 379/88.14, 88.13
See application file for complete search history.

(56) References Cited

U.S. PATENT DOCUMENTS

| | | | | |
|---|---|---|---|---|
| 5,870,454 | A | * | 2/1999 | Dahlen ................. 379/88.14 |
| 6,487,533 | B2 | * | 11/2002 | Hyde Thomson et al. . 379/88.06 |
| 2002/0128021 | A1 | * | 9/2002 | Kikinis et al. ........... 455/456.1 |
| 2002/0168986 | A1 | * | 11/2002 | Lau et al. ................ 455/456.1 |
| 2003/0060211 | A1 | * | 3/2003 | Chern et al. ............. 455/456 |
| 2003/0068974 | A1 | * | 4/2003 | Kanamaluru et al. ...... 455/3.06 |

FOREIGN PATENT DOCUMENTS

| | | |
|---|---|---|
| WO | 9904582 | 1/1999 |
| WO | 9956144 | 11/1999 |

* cited by examiner

*Primary Examiner* — Keith Ferguson
(74) *Attorney, Agent, or Firm* — Tope-McKay & Associates

(57) ABSTRACT

A system is disclosed for receiving, categorically storing, and supplying different types of location-specific audio information to either fixed or mobile users. The audio information is categorically stored by geographical location. As users travel through different environments (i.e., cities, freeway systems, airports) they can access audio information that is specific to their geographical location. Users may also annotate locations with real-time audio information. This audio information is accessible to mobile users using cellular phones, or other transceivers, and by fixed users using phones or computers.

36 Claims, 6 Drawing Sheets

A simple overview of how users and the Information Server may interact.

A simple overview of how users and the Information Server may interact.

Operations performed in audio information retrieval.

A simple cellular phone-based use of the system.

A user adds audio annotation and the user's current position to the Information Server.

AUDIO ON LOCATION

TECHNICAL FIELD

This invention relates generally to location-specific mobile telecommunications systems. More specifically, the present invention relates to a remotely accessible, location-specific, information storage and retrieval system.

BACKGROUND OF THE INVENTION

Conventional location-specific information systems are used to provide locally relevant information. For instance, a business establishment may play a recording announcing the goods or services that the establishment provides. Similarly, many museums have sound recordings that correspond to exhibits. These systems must be sufficiently spatially separated such that the audio signals do not interfere with one another. One proposed approach to preventing interference is to provide headphones at various locations. This approach has the advantage of allowing users to start the message when they arrive and in some cases even to select the language of the message. Such systems often require a significant infrastructure, and in some systems it is quite difficult to change the message.

Other current systems for delivering localized information to users rely on low power AM radio signals. Such systems are commonly used with respect to traffic and road conditions. This approach, while having much simpler requirements than the systems referred to above, suffers from additional significant drawbacks. First, such an approach is not location specific, but rather likely covers a fairly broad geographical area. Accordingly, the radio system likely delivers a general message applicable to the entire coverage area, and the listener may need to listen to an entire lengthy message in order to obtain the desired specific information. Furthermore, meteorological variations can impact both the area of coverage and quality of the radio signal.

Existing location-specific information systems do not enable real time access to evolving location-specific information and do not enable users to add new information. In addition, currently utilized location-specific information systems which track the user's position either require significant external infrastructure to facilitate user tracking or rely on very coarse position information, such as that obtained from a cellular phone. Presently a need exists for a system that enables users to access embedded information attached to a specific location by another user. Further, there is a need for a system that is capable of providing real time placement of annotations at various locations in the user's environment.

SUMMARY OF THE INVENTION

The present invention overcomes deficiencies of currently available location-specific information systems as discussed above. The invention described herein provides a device and method that enables a user to access embedded information associated with a specific location by another user. The present invention further provides for real time placement of new location specific annotations.

The device according to the present invention is comprised of a user interface, a position sensor, an information server, and a playback manager. The user interface provides a user with the ability to submit queries to a database; the user interface also provides information back to the user. The position sensor is comprised of a variety of complimentary sensors that provide user position and orientation to assist with the user-generated queries. The information server takes the position data and the information request and queries the database, references are then sent to the playback manager, and the playback manager delivers the preference filtered, location-specific information to the user interface.

Additionally, audio information can be spatially enhanced based on user position and orientation to appear to be coming from the area or object with which the audio is associated. In situations where the information is available only in text form or in a language other than the user's language of choice, the information is translated to spoken language as selected by the user. The database of location specific information is either contained in a distributed web based information server networked to a plurality of information sources or a dedicated independent server. Retrieved information can be user-annotated or user-modified, subject to parameters dictated by the system administrator. The user interface is not limited to a cellular phone; it can be any fixed or mobile communication device including traditional phones, computers, transceivers, radios, or mobile phones. The location of interest can be determined four ways: from the user's position, from the user's expected destination based on orientation, from a stationary user's reported destination, and from the user's designation of a remote location.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
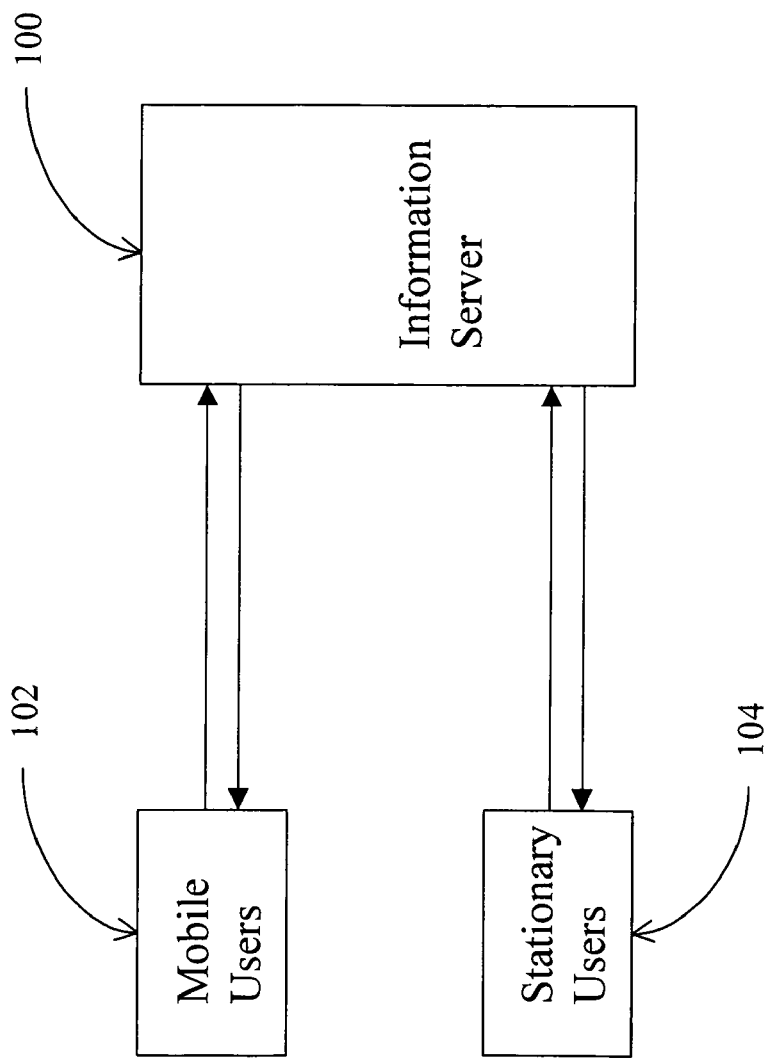
FIG. 1 is a general overview of an embodiment of the invention showing, without detail, how the invention functions.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention provides a system capable of providing interactive, remotely accessible, location-specific information. In one embodiment of this invention an information storage device categorically stores audio information by location. This information can then be accessed and modified or annotated by two-way telecommunication devices. In cases where only textual information is associated with the location, the user has the option of displaying the text or having the text automatically translated into an audible spoken language of the user's choice.

The following is one example of how the location information system provides a system capable of receiving a request for information. The request may be either an oral request or other type of signal originating with the user. The system determines the user's position; this may be done through a system-induced prompt or by a position report from either the user's device or external sources such as a global positioning system (GPS) or position triangulation using a plurality of antennae. Other position detection systems may also be used. Based on the user's location, and the nature of the query, the appropriate information is transmitted to the user. Alternatively, the system may receive a request to annotate or modify the information associated with a location. In this alternate embodiment of the present invention, the system queries the user for location, for subject matter, and then allows the requestor to transmit the information. This new information is then categorically stored, and immediately becomes accessible to other users.

The present invention has a broad base of potential users, including military and law enforcement personnel, search and rescue teams, drivers, consumers and many others. The invention is useful in any situation where a user wants or needs information pertaining to the user's position; additionally, the invention has utility as a means of "marking" a location for others. The term marking is to be understood as a figurative term denoting an electronic annotation that pertains to a specific geographical location.

A simple depiction of the invention is shown in FIG. 1. Mobile users 102 can access an information server 100 with a variety of transceivers, including cellular telephones and two-way radios. Fixed users 104 can access the information server 100 with virtually any devices that will allow them access to the information server 100, including an optional Internet connection, a cable connection, or a conventional telephone connection.

The ability of this invention to provide a forum whereby a user can access location specific information, and optionally search by subject using that information, is an important element of the present invention. A major component of the invention is its ability to easily provide location specific, real-time information that is remotely accessible. The ability for the information to be updated by users or other approved annotators allows for real-time reviews of specific location information and, further, optionally allows authorized users to post updates for specific locations, thus creating a type of forum. Additionally, this forum would be excellent for advertisers who wish to cater to a location-specific clientele. For instance, an annotation posted at a park could provide information about a game in progress at the park and could also provide information from an advertiser referencing the nearest location to purchase refreshments.

Figure 2:
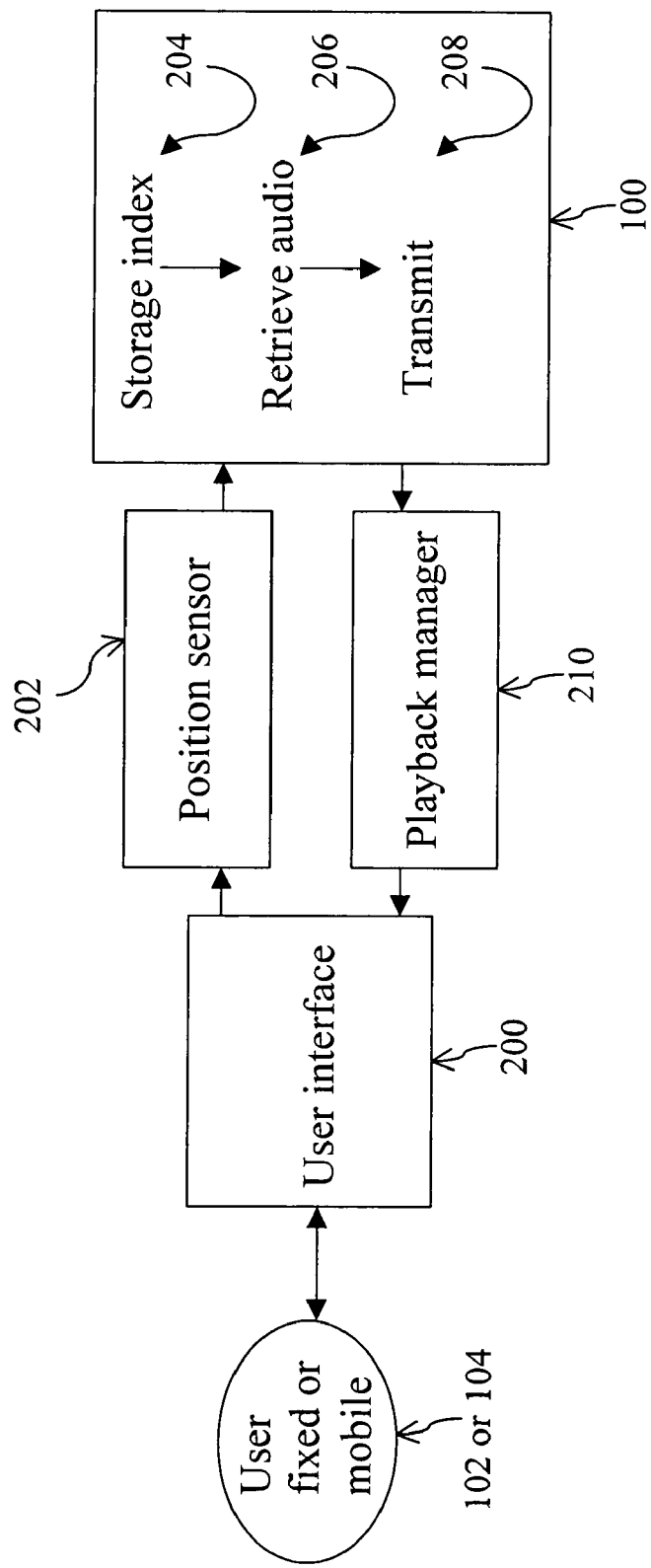
FIG. 2 is a flowchart of one embodiment of how the operation for audio retrieval may be performed.

Another embodiment of this invention is a system that enables mobile users 102 or fixed users 104 to retrieve location-specific audio information from the information server 100. Additionally this embodiment provides the necessary infrastructure to enable mobile 102 or fixed users 104 at any geographic location to add audio information to the information server 100. This real-time audio information can then be optionally accessed and updated by selected users. An example of the operations performed to retrieve audio is shown in FIG. 2. The user, fixed 104 or mobile 102, can make a verbal request. The user interface 200 can change the speech to text, if required, using speech recognition systems. The user position can be manually entered or automatically sensed 202. This request for information can then be transmitted to the information server 100. The position tag can be read, and the storage index 204 queried based on the user's location. The appropriate audio or other data is then retrieved 206, and transmitted 208 back to the playback manager 210. The transmitted information can then be changed from text to speech if necessary. It is then forwarded to the user interface 200 to finally be played to the user 102 or 104.

In the embodiment shown in FIG. 2, the system requires either that the user's position be manually entered by the user, or that the system to receive the user's position from an automatic position-sensing device 202 such as a global positioning system (GPS). The information server 100 can then retrieve the audio information that is stored relating to that specific location, and send it to the user.

Additional embodiments of the present invention allow explicit querying of the information server 100 based on the position and orientation of the user. Such querying can be achieved with the aid of a body-worn device such as a compass that transmits the orientation of the user to the information server 100. Alternatively, the orientation-detecting device could be contained within a telecommunication device. In these embodiments of the present invention, the user designates a subject or region of interest from a remote position. The system then determines what objects are potentially of interest between the user's current position and the user's desired position. The appropriate audio information can then be retrieved and played. The utilization of an orientation-device allows for this information to be optionally spatialized, and thus the audio can be enhanced to appear to be originating from the object or location of interest.

Figure 3:
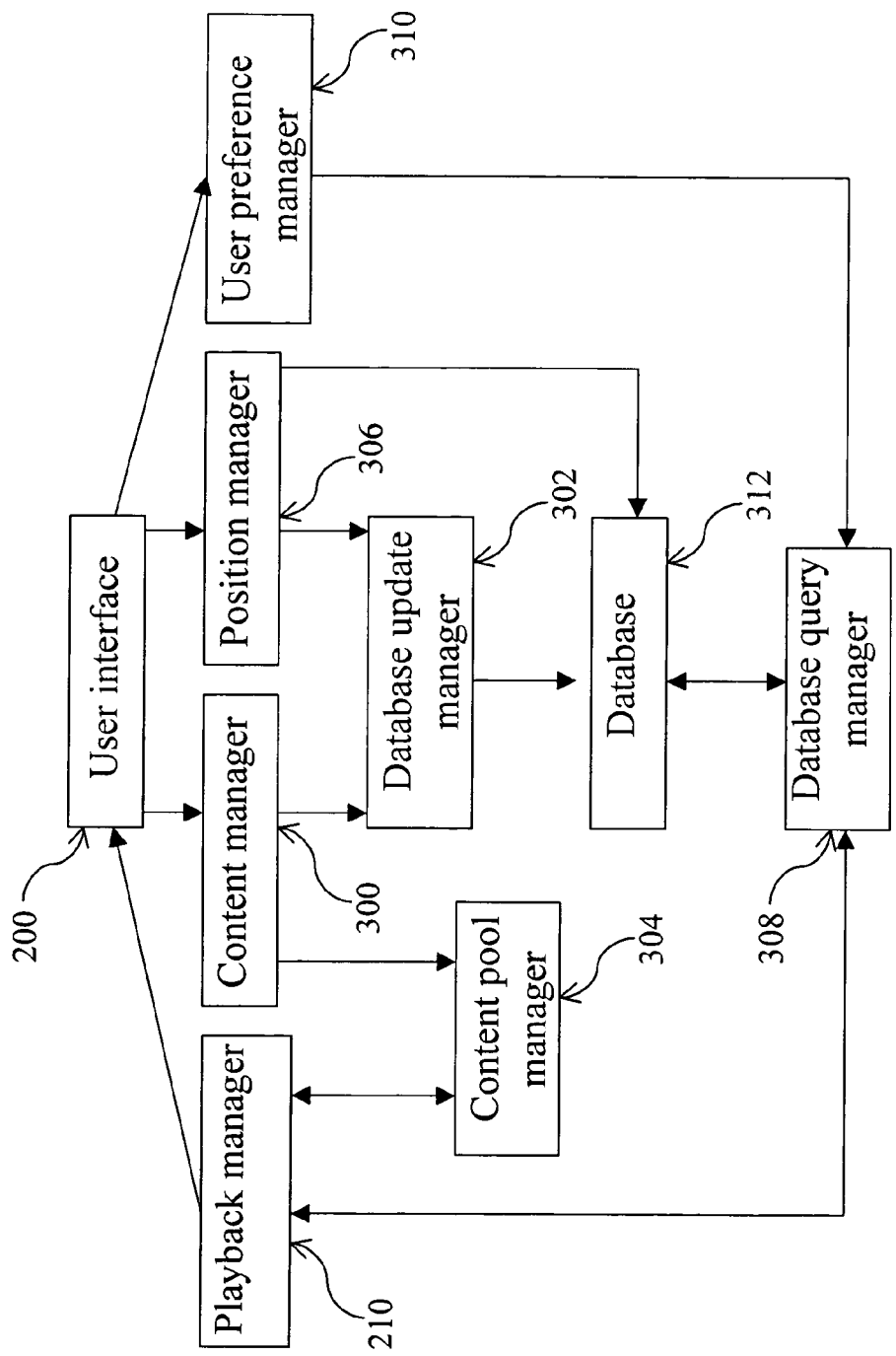
FIG. 3 is a block diagram of one embodiment of the operation of the information server.

Inherent in the embodiments of the present invention are a plurality of software elements designed to execute the various functions of the invention; these elements are depicted according to function in FIG. 3. First, the user interface 200 provides the user with the ability to selectively control the scope and generation of queries using voice, keyboard, touch pad or other input device. It also allows the user to provide relevant information in the form of preferences to aid in selecting and controlling audio playback messages.

The content input at the user interface 200 can be received by multiple functions within the software elements of the present invention, in particular, the content manager 300, the position manager 306, and the user preference manager 310. The content manager function 300 may receive content from the user interface 200 and subsequently send the appropriate links to the database update manager 302. The content manager 300 may then send the content provided to the content pool manager 304. Content provided at the user interface 200, whether as audio, text, or other form, may be stored in the content pool manager 304 as files referenced by a remote data storage location. This content may be locally or remotely distributed completely from the other system components.

Content in the present invention may also take the form of user preferences, either explicitly provided by the user at the user interface 200 or determined automatically by the system. The user preference manager 310 receives this content and subsequently supplies the appropriate information to the database query manager 308. The database query manager 308 in turn utilizes a filtering mechanism to identify specific types of audio information available in the database 312 that will be of interest to the user based on the user preference content. Classes of information might include public, private, business (e.g. restaurant, commerce), navigation, and general.

In the present invention, the user may explicitly provide position data at the user interface 200, or optionally have the position data automatically sent. The position manager 306 takes any user supplied position data, or alternatively position data from sensors, and sends this data to the database update manager 302 to be linked with the current recorded content. The database update manager 302 matches the content references with the position data, and updates the database 312 accordingly. Alternately, the position data may be received by the database query manager 308, which subsequently uses the position data to query the database 312 regarding relevant information.

Relevant content retrieved from the database 312 or the content pool manager 304 is received by the playback manager 210 which in turn sends it to the user interface 200. The audio may be spatially enhanced to appear to be coming from the area or object with which the audio was associated. In cases where only textual information is associated with the location, the user has the option of displaying the text or having the text automatically translated into an audible spoken language of the users choice at the user interface 200. Additionally the user has the ability to specify the audio playback to be in a language of the users choice.

Figure 4:
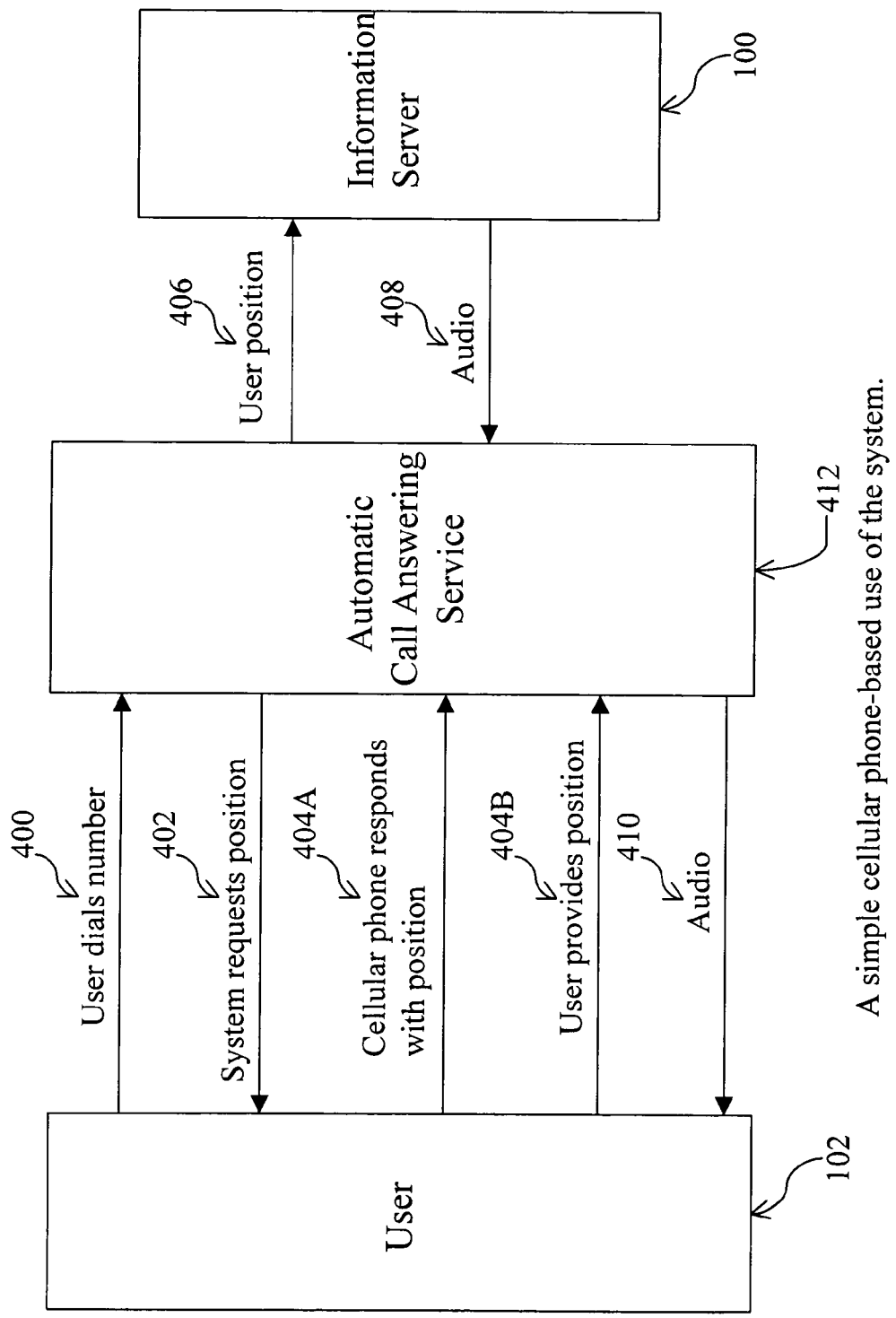
FIG. 4 is a view of one embodiment that shows a simple cellular phone-based use of the system.

In one preferred embodiment of the invention, a user with a mobile phone and GPS dials the number for the information server 100. FIG. 4 shows the user's interaction with the information server 100 through an automatic call answering service 412 for the simplest case in which there is only one item of information within the desired range of the user's position. After the user dials the number 400 of the call answering service 412, the system requests the users position 402, and either the position is supplied by the cellular phone 404A, or by the user 404B. The user position 406 is then supplied to the information server 100 which in turn supplies the location-associated audio 408 to the answering system 412. The answering system 412 then supplies this audio information 410 to the user.

In another preferred embodiment of the invention a slightly more complex operation takes place. The user hears a menu of items to allow the selection of specific information types or system functions. In one potential scenario the user selects to hear all the current audio about a specific location, and might hear something like "There are 5 information items within 20 meters of your current position. You may choose to listen to any one of them by entering the number of the item followed by the # sign. They are 1_____, 2_____, 3_____, 4_____, and 5_____." The user enters the number for the item of interest. The information is then retrieved from the server and played through the cell phone line as audio.

Figure 5:
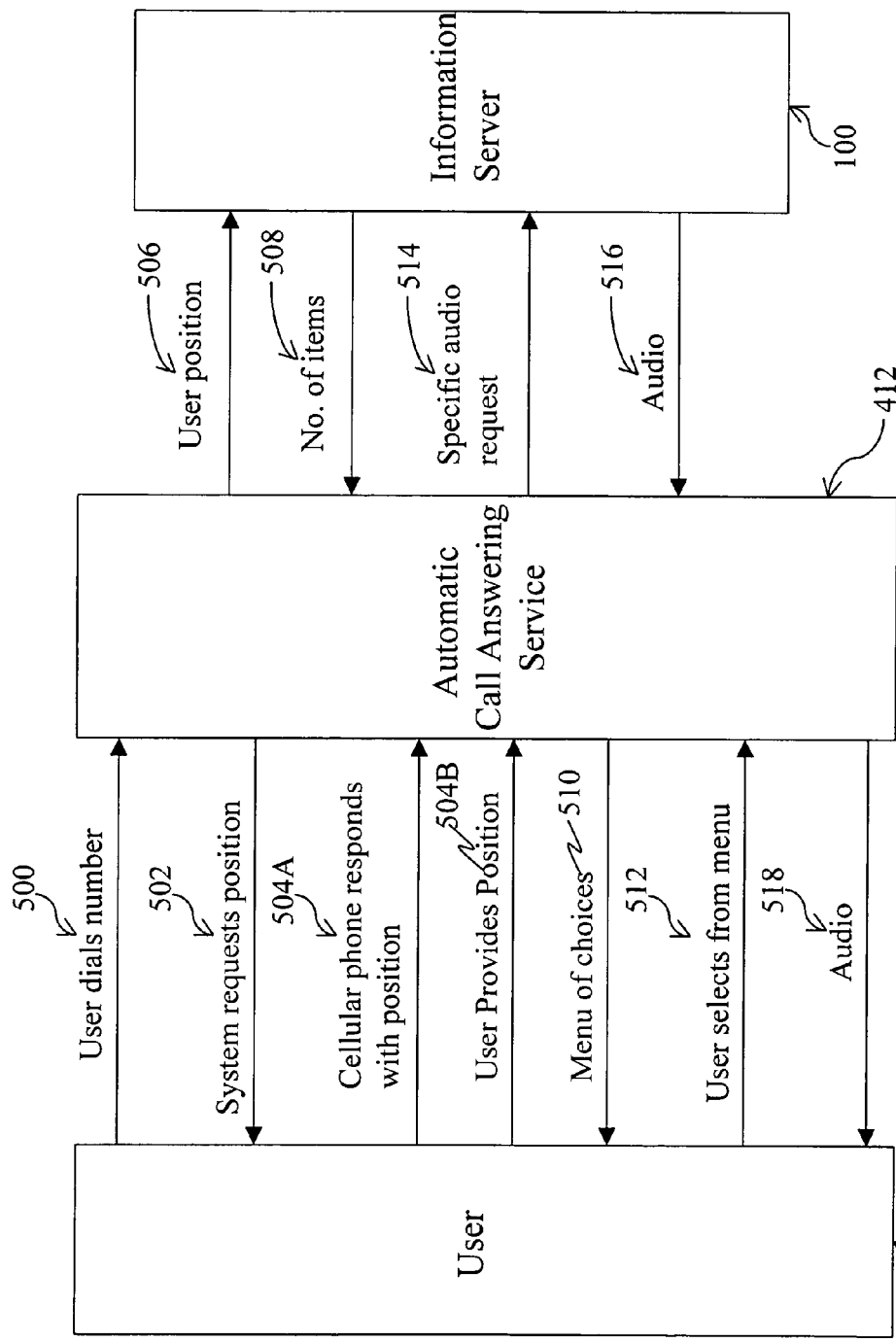
FIG. 5 is a view of one embodiment that shows a menu based interaction between a user with a cellular phone and the system.

A more detailed example is shown in FIG. 5. The user dials 500 the call answering service 412, the system requests the users position 502, and either the cellular phone responds with the user position 504A or the user provides the location 504B. The user position is then supplied 506 to the information server 100, and the information server 100 informs the call answering service 412 with the number of items stored for that geographic location 508. The call answering service 412 then supplies the user with a menu of choices 510, the user selects from the menu 512, the call answering service 412 supplies the specific request 514 to the information server 100, and the information server 100 then supplies the requested audio information 516 to the call answering service 412, which in turn supplies the audio 518 to the user.

In another embodiment, the system may be used in an information push mode where user location is constantly streamed to the server 100, and the server 100 automatically identifies and sends the audio to the user based on the user's location. User location can be determined with the aid of a global positioning system (GPS), or other location-determining devices.

Figure 6:
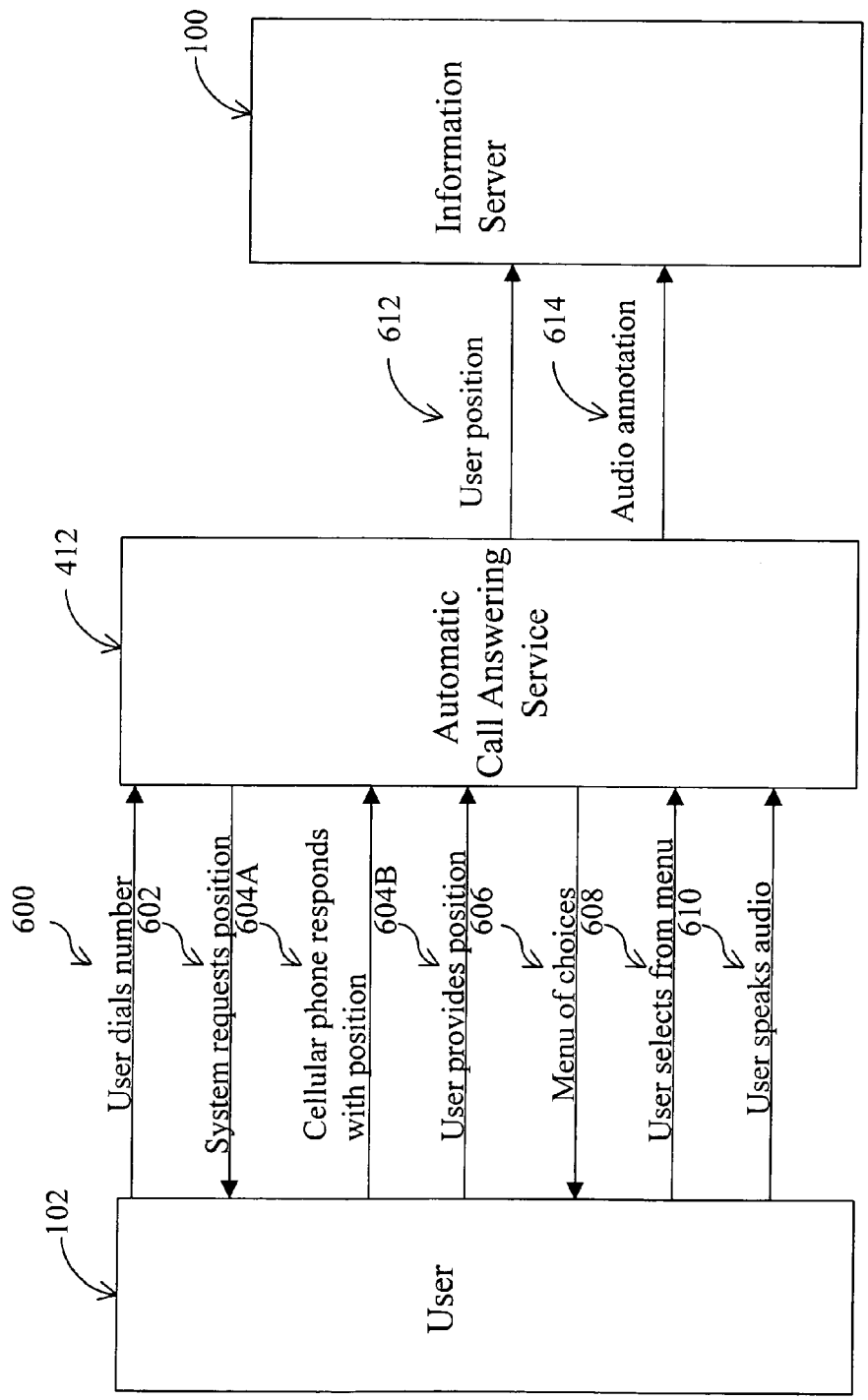
FIG. 6 is a view of one embodiment that shows how a user may add audio annotation to the information server.

FIG. 6 shows a case where a user annotates a geographic location. The user calls 600 the call answering service 412, the system requests the user position 602, and the cellular phone 604A or the user provides the position 604B. A menu of choices is supplied to the user 606 so that the user can select what category the information should be stored in 608. The user may hear something like "Press one to enter information on restaurants, or press two to enter information on businesses." The user then speaks the audio 610, the answering service 412 sends the user position 612, and the audio annotation information 614 to the information server 100. This audio is then immediately available for other users.

The ability of the present invention to supply audio information that is location-specific, and optionally, category- or orientation-specific, has obvious merits. Because the users, and specified annotators, can easily submit information updates, the current validity and relevance of the information provided by the system can be maintained. Fixed users 104 will have the ability to plan for an evening out, or a business trip across the country. The fixed users 104 will be able to peruse what a city has to offer from distant locations, and with an Internet interface, make reservations with the advantage of having the input of real-time reviews on which to base their decisions.

The present invention may provide the ability for a user to receive a real-time traffic report for the actual road that the user is traveling, or intending to travel. This would allow for a more detailed report to be catered to the specific user that would benefit from the information than can be provided by current AM radio-based systems. The user would not be required to listen to the traffic report of the entire city, but rather just that portion which is useful to the specific user. Additionally, the user would be able to annotate/update the road conditions with real time information, allowing the users behind him to choose intelligently what route would be the quickest and safest.

What is claimed is:

1. An audio information transmission device comprising: a user interface, a position detection system, an information server, and a playback manager, wherein, the user interface provides a user with an ability to submit queries to a database, and further provides location-specific information back to the user; the position detection system is comprised of a variety of complementary devices that provide user position data to assist with the user-generated queries;

the information server provides a means for communicating the queries and the position data to the database, and further provides a means for communicating references to the playback manager; the playback manager provides a means for delivering location-specific information to the user interface, wherein said position detection system further provides orientation data to assist with user-generated queries; and wherein said location-specific information is spatially enhanced based on the user position and orientation data to appear to be coming from a location or object with which the information is associated.

2. An audio information transmission device comprising: a user interface, a position detection system, an information server, and a playback manager, wherein, the user interface provides a user with an ability to submit queries to a database, and further provides location-specific information back to the user; the position detection system is comprised of a variety of complementary devices that provide user position data to assist with the user-generated queries; the information server provides a means for communicating the queries and the position data to the database, and further provides a means for communicating references to the playback manager; and the playback manager provides a means for delivering location-specific information to the user interface, wherein said position detection system further provides orientation data to assist with user-generated queries; and wherein said location specific information has an ability to be user-annotated or user-modified.

3. The audio information transmission device of claim 2 wherein said location-specific information has an ability to be user-annotated or user-modified provided the user has administrative authorization.

4. An audio information transmission device comprising: a user interface, a position detection system, an information server, and a playback manager, wherein, the user interface provides a user with an ability to submit queries to a database, and further provides location-specific information back to the user; the position detection system is comprised of a variety of complementary devices that provide user position data to assist with the user-generated queries; the information server provides a means for communicating the queries and the position data to the database, and further provides a means for communicating references to the playback manager; the playback manager provides a means for delivering location-specific information to the user interface, wherein said position detection system further provides orientation data to assist with user-generated queries; and configured to provide location-specific information based on an expected user destination determined from the user orientation data.

5. A method of providing audio information comprising acts of: providing a user interface whereby a user submits queries to a database; utilizing a position detection system comprised of a variety of position devices to generate a user position; communicating the queries and the position data through an information server to the database; communicating location-specific information through the information server to a playback manager; utilizing the playback manger to send the information to the user interface; utilizing the user-interface to communicate the information to the user, wherein the position detection system further collects user orientation data; and wherein said location-specific information is spatially-enhanced based on the user position and orientation data to appear to be coming from an area or object with which the information is associated.

6. A method of providing audio information comprising acts of: providing a user interface whereby a user submits queries to a database; utilizing a position detection system comprised of a variety of position devices to generate a user position; communicating the queries and the position data through an information server to the database; communicating location-specific information through the information server to a playback manager; utilizing the playback manger to send the information to the user interface; utilizing the user-interface to communicate the information to the user, wherein the position detection system further collects user orientation data; and wherein said location-specific information has an ability to be user-annotated or user-modified.

7. The method of providing audio information of claim 6 wherein said location-specific information has an ability to be user-annotated or user-modified provided the user has administrator authorization.

8. A method of providing audio information comprising acts of: providing a user interface whereby a user submits queries to a database; utilizing a position detection system comprised of a variety of position devices to generate a user position; communicating the queries and the position data through an information server to the database; communicating location-specific information through the information server to a playback manager; utilizing the playback manger to send the information to the user interface; utilizing the user-interface to communicate the information to the user, wherein the position detection system further collects user orientation data; and configured to provide location-specific information based on expected user destination inferred from the user orientation data.

9. An information delivery system comprising: a database comprised of data associated with a plurality of specific geographic locations; a user interface allowing a user to determine a user-specified-specific-geographic location; a position detection system capable of providing the user-specified-specific-geographic location; and an information server associated with the database and the user interface, wherein the information server assists with querying the database based upon the user-specified-specific-geographic location and returns data associated with the user-specified-specific geographic location to the user through the user interface, wherein the position detection system further provides orientation data to assist with user-generated queries; and wherein the data associated with the user-specified-specific-geographic location provided to the user is based upon an expected user destination determined from the orientation data.

10. An information delivery system comprising: a database comprised of data associated with a plurality of specific geographic locations; a user interface allowing a user to determine a user-specified-specific-geographic location; a position detection system capable of providing the user-specified-specific-geographic location; and an information server associated with the database and the user interface, wherein the information server assists with querying the database based upon the user-specified-specific-geographic location and returns data associated with the user-specified-specific geographic location to the user through the user interface, wherein the position detection system further provides orientation data to assist with user-generated queries; and wherein the data associated with the user-specified-specific-geographic location is spatially enhanced based on the user's position and orientation to appear to be coming from a location with which the data is associated.

11. An information delivery system comprising: a database comprised of data associated with a plurality of specific geographic locations; a user interface allowing a user to determine a user-specified-specific-geographic location; a position detection system capable of providing the user-specified-specific-geographic location; an information server associated with the database and the user interface, wherein the information server assists with querying the database based upon the user-specified-specific-geographic location and returns data associated with the user-specified-specific geographic location to the user through the user interface, wherein the position detection system further provides orientation data to assist with user-generated queries; and wherein a user may annotate or modify the data associated with the plurality of specific geographic locations in the database.

12. A method for information delivery comprising acts of: choosing a user-specified-specific-geographic location by utilizing a position detection system, wherein the user-specified-specific-geographic location is a user's position; querying a database based upon the user-specified-specific-geographic location; returning data associated with the user-specified-specific-geographic location to a user, wherein the position detection system further provides user orientation data; and wherein the act of returning the data further comprises an act of spatially enhancing the data based on the user's position and orientation data to appear to be coming from a location with which the data is associated.

13. A method for information delivery comprising acts of: choosing a user-specified-specific-geographic location by utilizing a position detection system, wherein the user-specified-specific-geographic location is a user's position; querying a database based upon the user-specified-specific-geographic location; returning data associated with the user-specified-specific-geographic location to a user, wherein the position detection system further provides user orientation data; and allowing a user to modify or annotate data associated with a plurality of specific geographic locations.

14. An audio information transmission device comprising:
a user interface, a position detection system, an information server, and a playback manager, wherein,
the user interface provides a user with an ability to submit queries to a database, and further provides location-specific information back to the user;
the position detection system is comprised of a variety of complimentary devices that provide user position data to assist with the user-generated queries;
the information server provides a means for communicating the queries and the position data to the database, and further provides a means for communicating references to the playback manager; and
the playback manager provides a means for delivering location-specific information to the user interface, wherein
the location-specific information has an ability to be user-annotated or user-modified.

15. The device of claim 14, wherein the position detection system further provides orientation data to assist with user-generated queries.

16. The device of claim 15, wherein said location-specific information is spatially enhanced based on the user position and orientation data to appear to be coming from a location or object with which the information is associated.

17. The device of claim 15, configured to provide location-specific information based on an expected user destination determined from the user orientation data.

18. The device of claim 14, wherein said playback manager further provides preference-filtered information to the user interface.

19. The device of claim 14, wherein said location-specific information is provided to the user as text.

20. The device of claim 14, wherein said location-specific information that is only available as text is automatically converted from text to a user-selected spoken language.

21. The device of claim 14, wherein said location-specific audio information is automatically translated from a spoken language to another spoken language of the user's choice.

22. The device of claim 14, wherein said information server is either a distributed Internet-based information server networked to a plurality of information sources or a dedicated independent server.

23. The device of claim 14, wherein said location-specific information has an ability to be user-annotated or user-modified provided the user has administrative authorization.

24. The device of claim 14, wherein said user interface a two-way communications device.

25. The device of claim 24, wherein said two-way communications device is selected from the group consisting of a wireless phone, a mobile phone, a traditional phone, a fixed or mobile transceiver, and a computer.

26. A method of providing information comprising acts of:
providing a user interface whereby a user submits queries to a database;
utilizing a position detection system comprised of a variety of position devices to generate user position;
communicating the queries and the position data through an information server to the database;
communicating location-specific information through the information server to a playback manager;
utilizing the playback manager to send the information to the user interface; and
utilizing the user-interface to communicate the information to the user,
wherein the location-specific information has an ability to be user-annotated or user-modified.

27. The method of claim 26, wherein the position detection system further collects user orientation data.

28. The method of claim 27, wherein said location-specific information is spatially-enhanced based on the user position and orientation data to appear to be coming from an area or object with which the information is associated.

29. The method of claim 27 configured to provide location-specific information based on expected user destination inferred from the user orientation data.

30. The method of claim 26, wherein said location-specific information is available as text.

31. The method of claim 26, wherein said location-specific information that is only available as text is automatically converted from text to a user-selected spoken language.

32. The method of claim 26, wherein said location-specific audio information is automatically translated from a spoken language foreign to the user to a language of a user's choice.

33. The method of claim 26, wherein said information server is either a distributed Internet-based information server networked to a plurality of information sources or a dedicated independent server.

34. The method of claim 26, wherein said location-specific information has an ability to be user-annotated or user-modified provided the user has administrator authorization.

35. The method of claim 26, wherein said user interface is a two-way communications device.

36. The method of claim 26 configured to provide location-specific information based on the user's expected destination as determined from user input.

\* \* \* \* \*